Figure 1:
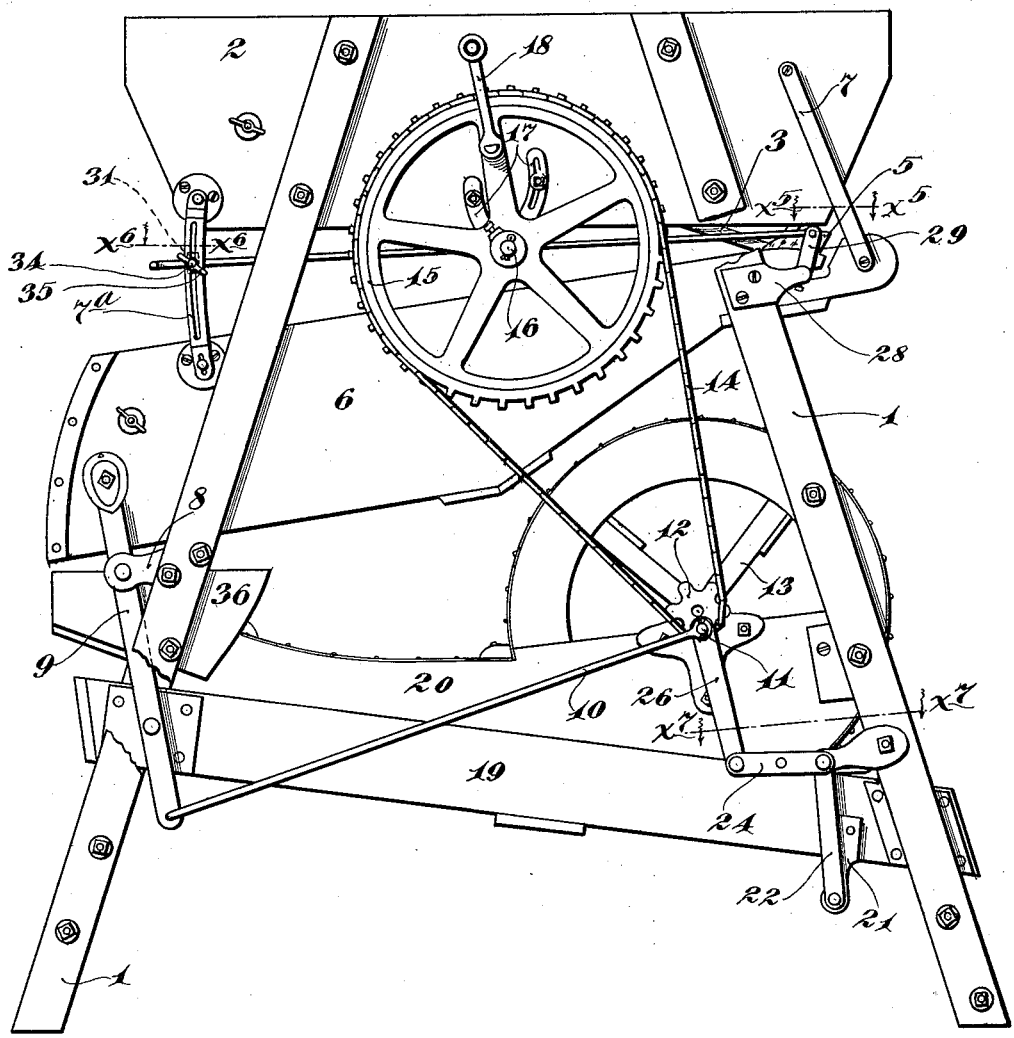

C. F. ASPLUND.
GRAIN SEPARATOR.
APPLICATION FILED JUNE 26, 1909.

1,013,266.

Patented Jan. 2, 1912.
4 SHEETS—SHEET 2.

Witnesses:
L. L. Simpson
E. C. Skinkle

Inventor:
Charles F. Asplund
By his Attorneys:
Williamson Merchant

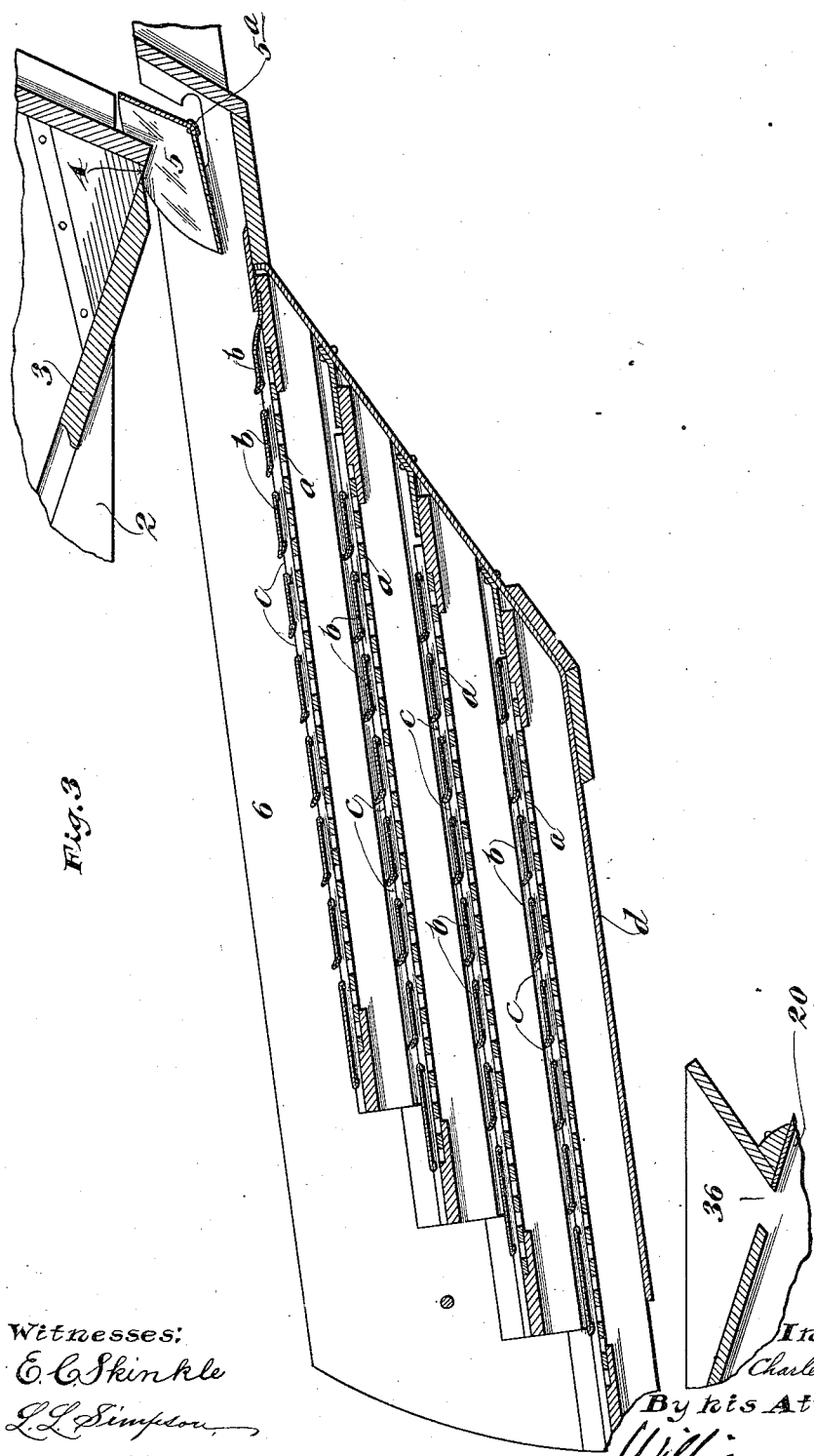

C. F. ASPLUND.
GRAIN SEPARATOR.
APPLICATION FILED JUNE 26, 1909.
1,013,266.
Patented Jan. 2, 1912.
4 SHEETS—SHEET 4.
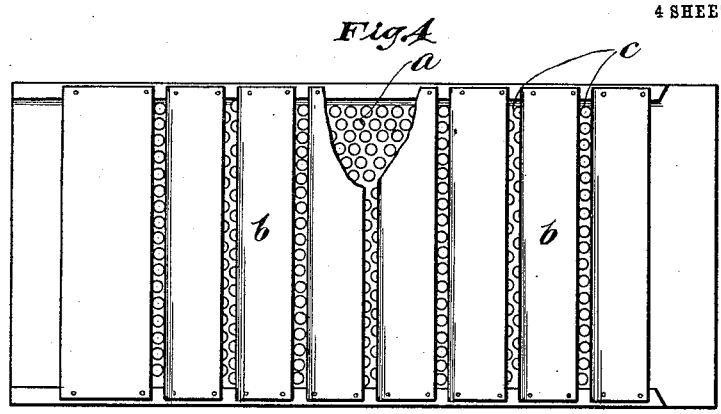
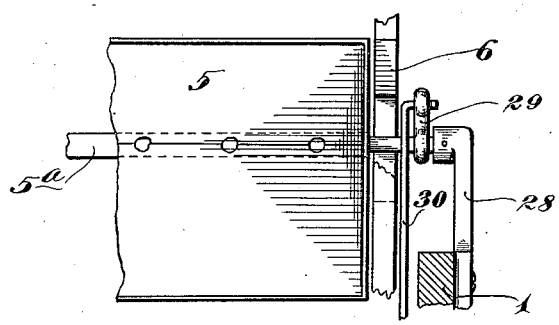
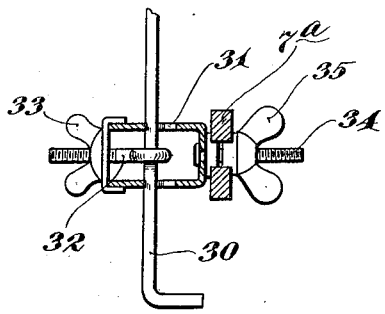
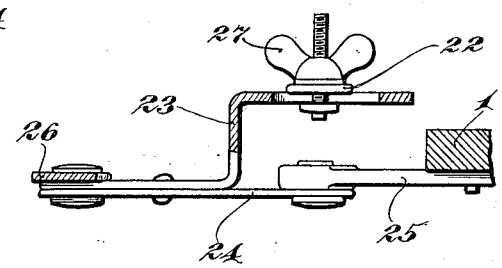
Witnesses
E. C. Skinkle.
L. L. Simpson.
Inventor:
Charles F. Asplund
By his Attorneys:
Williamson Merchant

UNITED STATES PATENT OFFICE.

CHARLES F. ASPLUND, OF MINNEAPOLIS, MINNESOTA, ASSIGNOR OF ONE-HALF TO ROBERT J. OWENS, OF MINNEAPOLIS, MINNESOTA.

GRAIN-SEPARATOR.

1,013,266.      Specification of Letters Patent.      Patented Jan. 2, 1912.

Application filed June 26, 1909. Serial No. 504,528.

*To all whom it may concern:*

Be it known that I, CHARLES F. ASPLUND, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My invention has for its object to provide an improved grain separator, especially well adapted for the separation of wheat and oats from each other and from the other grains and seeds with which they are usually found commingled when threshed; and to this end, my invention consists in the novel devices and combinations of devices hereinafter described and defined in the claims.

Throughout the spring wheat belt, and on the Pacific Coast, there grows what is known as wild oats. This is found on the original or native sod of the wild prairie or other land, as well as after the soil is cultivated. The wild oat is very hardy, and will germinate and grow after lying in the soil dormant for years. The wild oats has less meat than the tame oat, being nearly as long but more slender, of less weight and has a beard or, as the practical fanning mill men say, is "hairy." Throughout the same spring wheat belt, tame oats and wheat are frequently seeded or grown together on the same soil. The purpose of thus growing together the oats and wheat is to avoid chinch bugs and secure a larger product from the two crops than could be secured from a single grain on the same soil. The oats with the wheat give a heavier stand, thus better retaining the moisture in the ground, and chinch bugs will not work in moist soil.

Wherever oats are grown, whether wild or tame, alone or together with wheat, there is also much so-called "volunteer oats", or oats which grow of themselves from oats shattered out or carried to the soil from some previous crop. On the heads of the oat stalks, whether wild or tame, there is also found small kernels called pin oats, which closely correspond to nubbins of corn or sucker ears, considering their relative size in respect to the full sized kernels of oats on the same heads. In these various ways, the harvested crop contains a commingled product of wheat and oats, together, of course, with many other kinds of grass and weed seeds.

The term "succotash", as used among farmers and fanning mill men, seems to be most generally applied to cover any commingled product containing oats and wheat with other seeds and grains, whether the oat be wild, volunteer or seeded with the wheat and will be used in that broad sense in this case. It is recognized, of course, that the term "succotash" is sometimes used in the more limited or restricted sense to indicate the product of seeded oats and wheat. My machine will effect the separation in either case, but the seeded product is comparatively easy to separate. It is the commingled product containing the wild oats, and the various grass and weed seeds, along with the tame oats and the wheat, that presents the difficult problem for separation. My machine will do this and is the result of years of experience and study in this field of work.

The invention is illustrated in the accompanying drawings, wherein like references refer to like parts throughout the several views.

Figure 2:
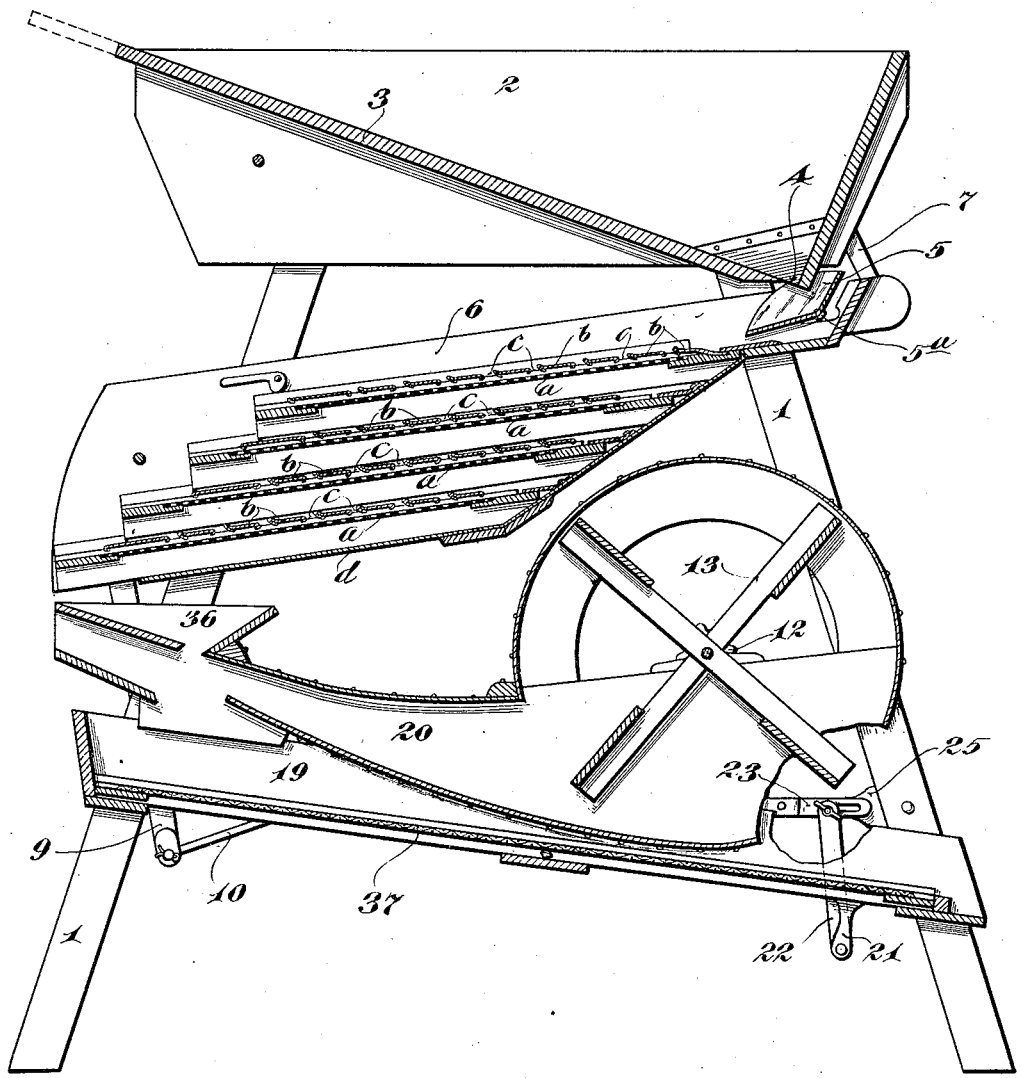

In said drawings, Figure 1 is a side elevation of my improved machine; Fig. 2 is a central vertical section taken lengthwise of the machine; Fig. 3 is a sectional view through the upper shoe and its hurdle of sieves and dividers and some of the connected parts in the same plane as Fig. 2, but on a larger scale; for better illustrating the relation of the dividers to each other and the series of sieves; Fig. 4 is a detail in plan showing one of the sieves and series of dividers detached from the shoe; Fig. 5 is a detail in horizontal section approximately on the line $x^5$ $x^5$ of Fig. 1; Fig. 6 is a detail in horizontal section approximately on the line $x^6$ $x^6$ of Fig. 1; and Fig. 7 is a detail in horizontal section approximately on the line $x^7$ $x^7$ of Fig. 1.

The numerals 1 represent supporting legs, which, taken together with the feed hopper 2 and the combined fan case and wind spout 20 coöperate to form the framework of the machine. All these parts 1, 2 and 20 are bolted or otherwise rigidly secured together and support all the movable elements of the mechanism. The feed hopper 2 has a sliding floor 3 adjustable to vary the feed throat or outlet 4. Directly under the hopper 2 is mounted a rocking feed trough 5, in position to deliver the stock supplied from the hopper to the head of an end shake sieve shoe 6. The upper or receiving end of the shoe 6 is suspended from the hopper 2 by a pair of hanger straps 7.

The numerals 8 represent brackets fixed to the rear pair of the frame legs 1.

The numerals 9 represent a pair of levers pivoted to the brackets 8 and having their upper ends pivotally connected to and supporting the lower or delivery end portion of the sieve shoe 6. The lower ends of the levers 9 are connected by pitman rods 10, with crank pins 11 formed integral with sprockets 12 on the shaft of fan 13. One of the sprockets 12 is connected by a chain 14 with a driving sprocket 15, shown as supported on a stud shaft 16 cast integral with a two-armed bracket 17 bolted to one of the side plates of the feed hopper 2 and provided with a detachable hand crank 18. The two-armed bracket 17 has one of its arms slotted, so as to permit the bracket to receive an angular adjustment adapting the same to move the sprocket 15 and to secure the same in any position necessary to tighten the driving chain 14. It is obvious that when motion is imparted to the sprocket 15 by the hand crank 18, or otherwise, that rotary motion will be given to the fan 13 and that endwise shaking motion will be imparted, by the connections 9, 10, 11 and 12, therefrom to the sieve shoe 6.

In addition to the upper or sieve shoe 6, the machine has a lower or finishing screen shoe 19 located below the combined fan case and wind spout 20. The lower or screen shoe 19 is pivotally suspended at its receiving end by the lower portions of the levers 9, and receives its end shake motion therefrom through the same connections, hitherto noted, which impart the end shake motion to the upper or sieve shoe 6. At its delivery end, the lower or screen shoe 19 is pivotally supported by sets of adjustable connections which coöperate with the end shake devices to impart a jump motion to this lower screen shoe. As shown, the said shoe 19 has a pair of depending brackets 21 connected by hanger arms 22 with the slotted ends of bent levers 23 riveted to straight levers 24. The levers 24 have their outer ends pivoted to brackets 25 fixed to and projecting from the forward pair of the frame legs 1. The inner ends of the levers 23 and 24 are pivotally connected to the lower ends of pitman rods 26 which connect to the crank pins 11 on the sprockets 12 of the fan shaft. Hence, under the motion of the pitmen 26 the levers 23 and 24 will rock up and down and, therefore, raise and lower the delivery end of the screen shoe 19 and in coöperation with the end shake, on this screen shoe, will impart the jump motion thereto. The amount of the jump can be varied by shifting the pivot points, at which the upper ends of the hanger arms 22 are connected, to the slotted ends of the bent levers 23. This is readily done by the thumb screw clamps 27.

The feed trough 5 is riveted to a shaft 5ª, the ends of which project and are journaled in brackets 28 fixed to the frame legs 1. The shaft 5ª has a crank arm 29, the upper end of which has pivoted thereto a rod 30. The rod 30 extends through a guide bracket 31 and the eye of a clamping screw 32 subject to thumb nut 33, for securing the rod 30 in any desired longitudinal adjustment in respect to the bracket 31. The bracket 31 is, in turn, carried by a clamping screw 34 subject to a thumb nut 35, which parts 34 and 35 work in a slotted link 7ª pivotally connected to the hopper 2 and the shoe 6, and transmitting motion from said shoe 6 to said rod 30 and the feed trough 5. By adjusting the rod 30 lengthwise through the guide bracket 31 and the clamp made up of the parts 32 and 33, the angle at which the delivery edge of the feed trough 5 will stand can be varied. On the other hand, if the clamping devices 34 and 35 and the guide brackets 31 be raised and lowered in the slotted hanger arm 7ª, the amount of the throw on the feed trough 5 imparted by the hanger arm 7ª will be varied. Hence, the action of the feed trough 5 may be varied in these two different respects so as to insure the desired feed of the stock to the head of the shoe 6.

Directing attention now to the chief feature of my invention, it will first be noted that this is found in the upper or sieve shoe 6, and the details of the structure can best be understood from an inspection of Figs. 2, 3 and 4. Referring to these views, it will be seen that in the said shoe 6 there is mounted a superimposed series of four perforated zinc sieves, marked each with the reference *a*. These sieves extend in the same general direction, each lower sieve projecting farther in the line of the travel of the stock and starting lower down in respect to the overlying sieve. This is an old and well known arrangement of perforated zinc sieves in an end shake shoe. My improvement consists in the addition thereto of the series of dividers *b* impervious to oats spanning the faces of the respective sieves *a*, in substantially a common plane, substantially parallel with the faces of the sieves, with the dividers *b* slightly separated from each other and their lower or delivery edges turned up or otherwise made slightly higher than their upper or receiving edges. These dividers *b* are conveniently made of imperforate strips of sheet metal rigidly secured to the upper edges of the side frames of the sieves *a*. The shoe 6 is, of course, so hung that the sieves *a* and the dividers *b* stand at a slight downward dip or work on a slope from their receiving to their delivery ends. The distances at which the dividers *b* may be spaced apart from each other, lengthwise of the sieve, depends partly on this angle at which the sieves and dividers work in the shoe and partly on the amount of the end shake motion imparted to the shoe. With the machine as illustrated, the throw of the shoe is about a half inch and the spaces *c* between the dividers *b* are about a quarter of an inch in width.

Underneath the lowermost member of the series of sieves *a* is a gather board *d* which receives the stock that passes downward through the entire hurdle of the sieves and directs the same to a small hopper 36 formed on the top wall of the wind spout 20 and adapted to deliver the stock received thereby through the blast of air onto the receiving end of a finishing screen 37 mounted in the bottom shoe 19.

Operation or action on the stock: Let it be assumed that the machine is in motion and that the succotash or commingled product of wheat, oats, other grain and seeds is being supplied to the feed hopper 2 and by the rocking feed trough 5 to the head of the sieve or shoe 6. It will also be understood that the driving connections for the feed trough 5 have been properly set to feed this succotash in an even stream across the entire width of the delivery edge of the feed trough and the head board of the uppermost sieve. As the stock thus comes onto the head of the shoe 6, it will first pass over the head member of the dividers *b* on the uppermost sieve. When the first gap *c* between the successive dividers *b* is reached, most of the wheat, smaller grains and seeds will pass through the said head slots *c* or between the adjacent edges of the dividers *b* and onto the separating surface of the top sieve, but most of the oats and all the coarse light material will jump the slot *c* and pass onto the next divider *b* above the face of the top sieve, under the effect of gravity and the shaking motion of the sieve. The turned-up delivery edges of the dividers assist to make the oats jump the slots *c*. These actions will be repeated, as the stock travels on downward over the dividers *b* of the top sieve and by the time that this stock reaches the last divider *b* over the face of the top sieve, there will be practically nothing left but oats and coarse light foreign material going off as overtail; or otherwise stated, all the wheat, other smaller grains and seeds, and a small fraction of the oats will have passed through more or less of the slots *c* between the dividers *b* of the top sieve onto the separating surface or face of the top sieve. On the face of the top sieve itself, a further separation will take place, eliminating and passing off as overtail another fraction of the oats, but all the wheat, other grains and seeds will pass through the perforations of this top sieve and fall either entirely or chiefly onto the imperforate dividers *b* of the next underlying sieve; and here similar actions will be repeated refining the separation and eliminating the then remaining largest percentage of the oats. On the third or next lower sieve these actions will be repeated so that, by the time that the separating surface of the lowermost sieve is reached, there will be practically nothing left but wheat, smaller grains and seeds. These, of course, will pass through onto the gather board *d* and be directed by the hopper 36 through the wind blast from the fan to the head of the finishing screen 37. The light foreign material remaining in this product as it comes from the gather board *d* and the hopper 36 will be blown out by the wind blast. The wheat and the heavier smaller grains and seeds will all go onto the head of the finishing screen 37. This screen 37 is of fine enough mesh to hold the desired wheat and to pass therethrough all the smaller grains and seeds including the pin oats which have not been blown out by the blast. Hence, as the wheat leaves the machine, it will be free from all foreign material whatsoever.

From the action above traced, it will be seen that the distinguishing feature is the minimizing of the chance for any oats to reach the separating surfaces of the sieves *a*. The dividers *b* practically support the oats on smooth flat surfaces throughout the whole course of the separation, out of contact from the sieve faces and then deliver the oats across the gaps *c* to the next lower adjacent dividers lengthwise of the same sieves, thus skidding the oats off as overtail. There is nothing to make the oats turn up and, hence, they travel flat and lengthwise. By actual usage, I have demonstrated the efficiency of this hurdle of sieves and dividers for doing this class of work. The complete separation is effected by a single passage of the succotash or commingled stock through the machine. No recleaning or "repeat action" is necessary. I have also found, in practice, that this hurdle has relatively large capacity as compared with any other grain separator known to me containing an equal amount of sieve face or separating surface.

Of course, it will be understood that the details of the structure can be changed without departing from the spirit of the invention.

What I claim is:

1. In a grain separator, the combination with a shaking shoe, of a series of superimposed sieves therein, and a series of rigidly secured dividers for each of said sieves, separated from each other at their edges and spaced entirely above the underlying sieves, in substantially a common plane parallel with the said underlying sieves and the said sieves being continuous under the overlying dividers, and with a continuous passage between the upper surface of each of said sieves and the overlying dividers, and the said dividers and sieves coöperating to distribute the wheat, small grain and seeds between the adjacent edges of said dividers to the underlying sieves, at different points lengthwise thereof, while supporting the oats and delivering the same across the intervening gaps between successive dividers and skidding the same off as overtail, substantially as described.

2. In a grain separator, the combination with a shaking shoe, of a series of superimposed sieves therein and a series of slightly separated dividers rigidly secured in respect to said sieves and spanning the respective sieve faces, in substantially a common plane substantially parallel therewith, which dividers have their delivery edges slightly higher than their receiving edges, and coöperate with each other and the sieves to distribute the wheat, smaller grain and seeds, between their adjacent edges, to the underlying sieves, at different points lengthwise thereof, while supporting the oats, delivering the same across the intervening gaps between successive dividers and skidding the same off as, overtail, substantially as described.

In testimony whereof I affix my signature in presence of two witnesses.

CHARLES F. ASPLUND.

Witnesses:
HARRY D. KILGORE,
JAS. F. WILLIAMSON.

---

Copies of this patent may be obtained for five cents each, by addressing the "Commissioner of Patents, Washington, D. C."